Patented Nov. 8, 1932

1,886,504

UNITED STATES PATENT OFFICE

JOHANN JOSEPH STOECKLY, OF TELTOW-SEEHOF, AND ERHARD WITTE, OF LICHTER-FELDE-BERLIN, GERMANY, ASSIGNORS TO AMERICAN GLANZSTOFF CORPORATION, OF NEW YORK, N. Y.

PURIFICATION OF CELLULOSE SOLUTIONS

No Drawing. Application filed April 24, 1930, Serial No. 447,103, and in Germany April 17, 1929.

In the manufacture of artificial silk from cellulose solutions considerable difficulties have been experienced due to pollution (contamination) especially emanating from the pulp used. These pollutions are for the most part resinous materials which discolor the viscose, gradually conglomerate, and finally interfere with the spinning process. Direct mechanical cleaning such as filtering, centrifuging or settling does not ordinarily give success.

In an earlier process it was proposed that the surface effect of certain emulsified bodies present in the viscose be used in order to purify it. With this process, filtration would be unnecessary. After that the mixture is either centrifuged or allowed to settle. Examples of such liquids are kerosene, liquid paraffin, benzol, carbon tetrachloride, ethylene-trichloride, chloroform. Other liquids possessing similar properties may, of course, be used. The product resulting from the use of this process is much lighter in color, and may be easily spun to make artificial filaments.

The process as outlined in the present specification presents a considerable improvement over the earlier process, discussed above. In the process outlined supra it was observed that the greatest difficulty was not due to the fact that filter presses would not retain the coarsest of the polluting particles, but seemed to arise, for the most part, from the presence of certain resinous substances not easily retained by the filter presses. The passage of these substances through the presses caused the greatest trouble in spinning. Practical tests have shown that it is advisable to first subject the cellulose solution to a preliminary filtration, and then to proceed with a surface cleaning. By using this process a smaller amount of the emulsifying liquid may be used than was necessary in the older purifying procedure. For example, dependent upon the efficacy of the preliminary filtration, from 0.2 to 2 kg. of an organic liquid, such as liquid paraffin, are used for 100 kg. of the cellulose solution. After the emulsifying solution has been finally dispersed throughout the cellulose solution by means of a mixing apparatus, the solution is allowed to settle for a few hours in order to give the surface tension of the emulsion an opportunity to lose its effect. It has been found that it is not necessary to emulsify the whole of the cellulose solution, as a small amount of the solution may be emulsified with the organic liquid, and this emulsified portion later added to the main body of the solution, the whole being subjected to a violent stirring. Mechanical cleaning is next resorted to by means of settling (especially when the settling has not been efficacious during the settling period), through filtration (e. g. through a fine cloth), or by centrifugal action.

The cleansing effect of the above mentioned organic emulsifiable liquids on the cellulose solutions will be appreciably bettered if small amounts of certain organic materials, on the one hand possessing no precipitating effect on the cellulose, but on the other hand helping to form and refine the emulsion, are added. As examples of such substances, tending to aid in the formation of the emulsion, may be mentioned Turkey red oil, glycerine, and glycol. Other substances possessing the same property, could, of course, be used. An addition of even 1% of Turkey red oil, for example, produces a favorable effect. It must be assumed that the absorbing properties with regard to the pollutions increases with an increase in the surface of the emulsion. It is further thought that certain contaminations such as resin and dirt particles still remaining in the solution after filtering, centrifuging or settling, will be covered with a thin coating from the organic liquid. Aside from preventing agglomeration of these particles, the film permits of a much easier passage through the spinnerets.

This process may be used advantageously on cellulose solutions, especially viscose, which are made from pulp, and which still contain slime forming pollutions, such as resins, fats, waxes, or lignin like materials. This process may therefore be recommended especially for the preparation of German pulp brands, which very often cannot compete successfully with the Scandinavian and Canadian pulps.

*Example 1*

Pulp with a high content of resin of 1.2% (measured by extracting the cellulose with a mixture of one part alcohol and one part benzol) is used in the usual form for viscose preparation with a content of 7% cellulose and 7% alkali. The well dissolved viscose is freed from the coarser pollutions by means of filtration with the usual filter cloths. Thereafter 0.4 kg. of liquid paraffin is added to every 100 kg. of viscose solution, is well emulsified by stirring and the emulsion then carefully filtered after 24 hours. The viscose which has been thus purified is then spun at the desired degree of ageing in the usual viscose spinning baths, especially in sulphuric acid baths containing sulphates.

*Example 2*

As in Example 1, with the exception that 0.6 kg. of the organic emulsifying agent are used to 100 kg. viscose and 100 gms. Turkey red oil are added to the emulsion.

*Example 3*

As in Example 1, with the exception that 0.4 kg. of liquid paraffin is first kneaded with 2 kg. viscose in a small kneading apparatus and then the mixture is emulsified in the remaining quantity of the viscose.

Although only three specific examples of our improved process have been given, it is apparent, from the disclosure, that other combinations and percentages of material may be used. Therefore we do not intend to hereby limit this invention to the particular examples given.

What we claim is:

1. In a process for cleaning a cellulose solution, the steps of first filtering the solution, then treating a relatively small portion thereof with an organic liquid insoluble in the solution and with enough Turkey red oil to sufficiently emulsify the entire solution, emulsifying the solution and later mixing the portion so treated with the remainder of the solution.

2. In a process for cleaning a cellulosic solution, the step of emulsifying therewith 0.4% of liquid paraffin and then adding .01% of Turkey red oil.

3. The process as outlined in claim 2, wherein 2% of the solution is first treated with the paraffin and Turkey red oil, and this portion is then mixed with the remainder of the solution.

4. The process as outlined in claim 2, wherein 2% of the solution is first treated with the paraffin and Turkey red oil, and this portion is then mixed with the remainder of the solution and after allowing the solution to stand, filtering the same.

In testimony whereof, we have affixed our names to this application this 10th day of April 1930.

JOHANN JOSEPH STOECKLY.
ERHARD WITTE.